(12) United States Patent
Leite da Silva

(10) Patent No.: US 7,987,946 B2
(45) Date of Patent: Aug. 2, 2011

(54) TROPICALIZED PETROLEUM SECTOR CUT-OFF VALVE GEAR BOX SYSTEM AND DECONTAMINATION METHOD FOR GEAR BOXES

(75) Inventor: Osmar Jose Leite da Silva, Santos (BR)

(73) Assignee: Petróleo Brasileiro S.A. -Petrobras, Rio de Janeiro ( * ) Notice: Subject to any disclaimer, the term of this patent is extended or adjusted under 35 U.S.C. 154(b) by 1114 days.

(21) Appl. No.: 11/713,084

(22) Filed: Mar. 2, 2007

(65) Prior Publication Data

US 2007/0205113 A1 Sep. 6, 2007

(30) Foreign Application Priority Data

Mar. 3, 2006 (BR) ....................................... 0600700

(51) Int. Cl.
*F16H 57/04* (2010.01)
*F01N 1/00* (2006.01)
*F16N 17/02* (2006.01)
*F16K 31/44* (2006.01)

(52) U.S. Cl. ............................. 184/6.12; 184/6; 251/248

(58) Field of Classification Search .............. 184/6, 6.12, 184/15.1, 1.5; 251/248–250.5, 355
See application file for complete search history.

(56) References Cited

U.S. PATENT DOCUMENTS

| 4,119,117 | A  | * | 10/1978 | Winkelvoss | 137/456 |
| 4,696,073 | A  | * | 9/1987  | Urbania    | 15/302  |
| 6,273,214 | B1 | * | 8/2001  | Schumacher | 184/6.12 |
| 6,457,560 | B1 | * | 10/2002 | Evans et al. | 184/6.12 |
| 2002/0148686 | A1 | * | 10/2002 | Yun et al. | 184/1.5 |
| 2004/0261748 | A1 | * | 12/2004 | Lafleur | 123/196 R |
| 2006/0096809 | A1 | * | 5/2006  | Evans | 184/6.5 |
| 2006/0272900 | A1 | * | 12/2006 | Clyne | 184/15.1 |
| 2007/0193408 | A1 | * | 8/2007  | Martinez | 74/609 |

* cited by examiner

*Primary Examiner* — Michael R Mansen
*Assistant Examiner* — Robert T Reese
(74) *Attorney, Agent, or Firm* — Nixon & Vanderhye PC

(57) ABSTRACT

A tropicalized petroleum sector cut-off valve gear box system and its respective method of application are described. The system involves the conversion of any gear box model with cut-off valves used in the petroleum industry, into tropicalized gear boxes, so as to allow total preventative maintenance with no need for interruptions on production lines.

4 Claims, 3 Drawing Sheets

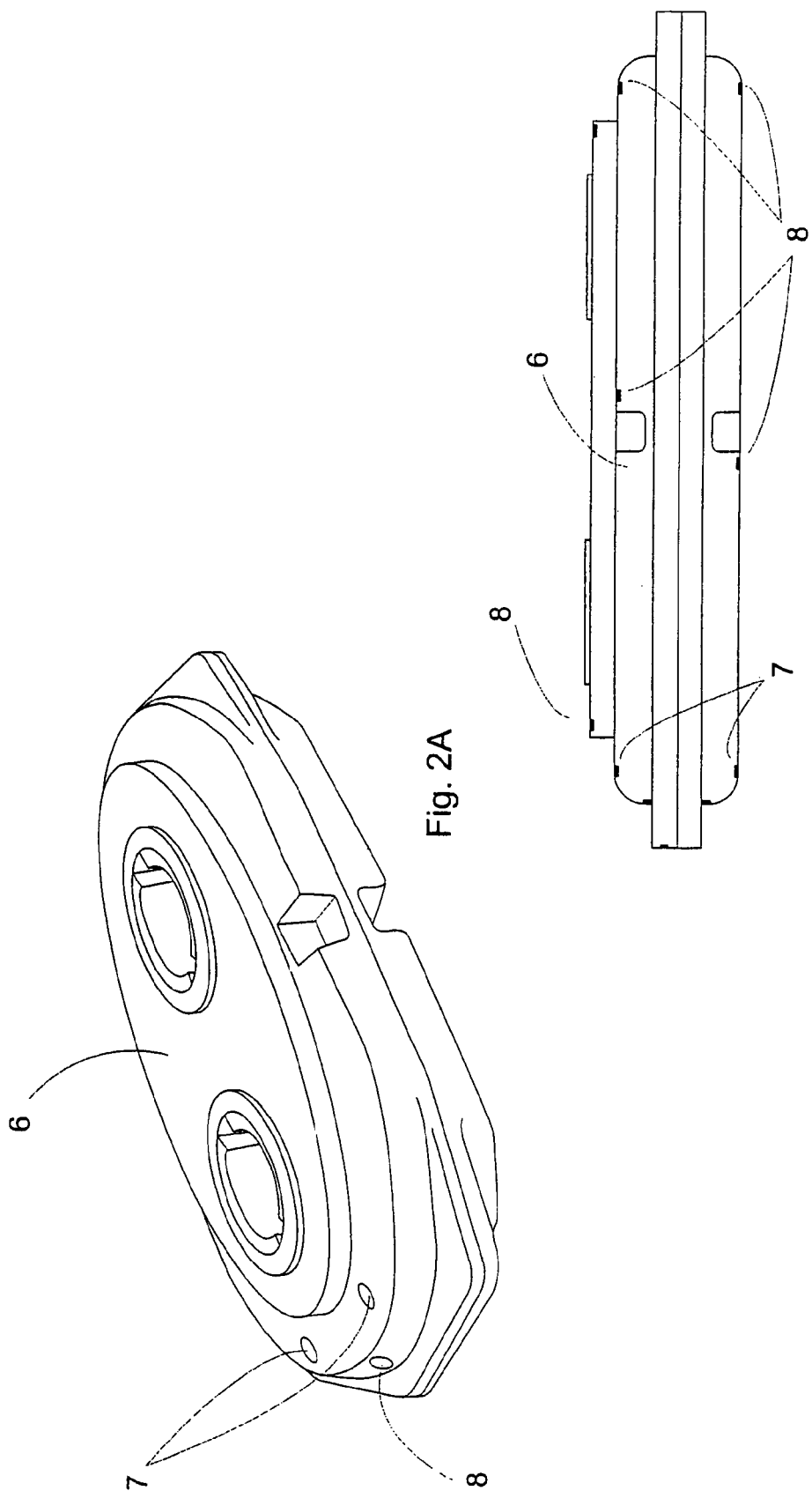

TROPICALIZED PETROLEUM SECTOR CUT-OFF VALVE GEAR BOX SYSTEM AND DECONTAMINATION METHOD FOR GEAR BOXES

CROSS REFERENCE TO RELATED APPLICATION

This application is based upon, claims the benefit of, priority of, and incorporates by reference, the contents of Brazilian Patent Application No. PI 0600700-7 filed Mar. 3, 2006.

BACKGROUND OF THE INVENTION

This invention refers to a tropicalized petroleum sector cut-off valve gear box system and its respective method of application.

The system describes the conversion of any model petroleum sector cut-off valve gear box, into tropicalized gear boxes, in such a way as to allow its total decontamination without interruptions on the production lines, and without dismantling, making the implementation of this component proper for use in the aggressive conditions of tropical climates, so as to lengthen its service life and operational reliability.

In a country with the tropical climate and size of Brazil, the petroleum industry must build and maintain all kinds of refineries that are in strategically located areas based on their economic viability, but these locations may not always offer the best climatic conditions for operation and maintenance.

In spite of the fact that each industrial petroleum plant is built with a particular configuration and layout, all follow a standard construction concept and have common equipment.

One of these pieces of equipment is the cut-off valve. Within the diverse classifications in existence, cut-off valves may be classified as manual or remote. These valves are generally quite large and even though they may be manually or remotely activated, they have a reduction gear box that reduces force of actuation on the closing component of the valve.

For a petroleum company that holds several industrial plants, remaining competitive is an important issue, which includes questions of operational and construction costs. In this sense, much of the equipment and components are cheaper when standardized, and for this reason they adopt the use of standardized assembly, maintenance, and mainly from suppliers.

One of the great advantages large companies have is precisely that ability to negotiate with suppliers due to the large quantity and amount of standardization of the components to be acquired.

On the other hand, in a country the size of Brazil, with climates varying from equatorial to subtropical zones, containing both arid and forested regions, the components acquired will suffer the actions of the many varieties of harsh conditions caused by these climates, depending on the location of the production unit where they will be installed.

In the majority of cases involving bidding for large purchases, standardization generally represents a great saving for the company, since equipment specifications to be bought meet the technical requirements of the operation. However, a margin of error should be kept in mind as far as the harsh conditions of climate are concerned, that some equipment will suffer when installed on any unit made because harsh climate conditions may cause more equipment to be sacrificed, causing a need for more frequent changes. In these units in particular, the savings resulting from purchasing standardized products is even greater than the cost with maintenance of defects that result from severe operational conditions.

In the specific case of cut-off valves, according to studies performed on several units, the cost to equip a refinery with all the cut-off valves necessary for production start up, is equal to around 10% of the total cost of the installation of the manufacturing plant.

This study took into consideration the cost of cut-off valves supplied by large manufacturers, that in turn, due to the fact that they are suppliers of companies that by and large are located in countries with a temperate climate, choose, for reasons of cost and competitive value, the most simple and cheapest version possible for equipment, without choosing retainers, labyrinths, seals, or o-rings.

When constructed under these favorable cost conditions, some refineries located in regions with an extremely hot and humid tropical climate, need to submit their cut-off valves to a much more rigid maintenance routine than those located in a temperate climate, and even account for the down time and rectifications as a consequence of the break-down of cut-off valves.

A typical example is the situation in which the refinery located in the city of Cubatao is found. According to data supplied by the local Department of Water and Energy, it has an average annual precipitation of 2767 mm, with reports of averages above 3300 mm, which results in average values of air humidity of close to 80%, which facilitates the formation of some secondary pollutants, one of which we can cite as acid rain.

Because of the low cost of cut-off valves and the ease of negotiating with the suppliers, the national reality in regards to their maintenance is to use them until they present some type of problem. This policy is successful for the most part in refineries where these valves are installed. However in refineries located in severe climatic conditions like those in Cubatao, this policy is not possible.

The high level of relative humidity and the great shifts in temperature in short time periods, favor condensation of humidity within the gear boxes of these valves, at a level that is well above-normal. This excessive condensation results in contamination of the lubricant. Due to the loss of efficiency in lubrication, the gear box may experience several problems, from locking up of the gears, interior corrosion of the box, perforations, and even breaking of the gear box itself.

One of the solutions found by the technical corps of refineries located in these kinds of regions was to apply retainers or seals in the cut-off valves originally supplied in a manufactured unit. However this practice was shown to be impracticable because of the cost of these components, since the greater the inviolability offered by the retainer and seal models, the greater the cost of acquisition and the greater the need for techniques for installation, which makes the adoption of this solution economically unfeasible, as well as for the cut-off valves in a single refinery.

Currently these valves require a rigid maintenance plan, which consists of dismantling the entire valve. The most sensitive component of the cut-off valve is the gear box. It is completely opened, and decontaminated out of the unit, and then remounted with new lubricant.

The operation was perfected to be carried out in the least amount of time possible, since it requires that the line where the valve is installed be interrupted. This routine consumes at least 133 days to carry out the maintenance cycle on 340 cut-off valves, exposing technicians excessively in the work field. Concomitant to the maintenance work, an inspection cycle is necessary which lasts around 12 days to get to the 340 cut-off valves. If this preventative plan of maintenance and inspection are not followed it will cause unexpected down time and even possible changes of all cut-off valves, or it might require a team on duty always ready for these types of emergency situations.

The concern addressed in the development of these techniques is to try and diminish the risk of accidents, physical integrity of field operations, unscheduled interruptions to production.

SUMMARY OF THE INVENTION

Along these lines, a new system was developed that may be used on cut-off valves of any model, or from any supplier, as a specific method to carry out some indispensable procedures to improve system performance.

The invention described below bypasses the continuation of research in this sequence, and has as an objective the simplification, accuracy, and reduction of costs in decontamination operations and preventative maintenance in cut-off valves.

This invention seeks to provide a tropicalized petroleum sector cut-off valve gear box system and its respective method of application. The system involves the conversion of any gear box model with cut-off valves used in the petroleum industry, in tropicalized gear boxes, so as to allow total preventative maintenance with no need for interruptions on production lines.

Other purposes that the tropicalized petroleum sector cut-off valve gear box system, the object of this invention, seeks to accomplish are listed below:

a. Facilitation of preventative maintenance in gear boxes;
b. Guarantee total decontamination of all the inner points in gear boxes;
c. Increase the service life of cut-off valves, avoiding break-downs, internal corrosion in gear boxes and connections;
d. Eliminate the need to dismantle gear boxes to perform maintenance;
e. Perform maintenance with the equipment running;
f. Increase reliability of the industrial refinery plant;
g. Substantially reduce the time necessary for maintenance for each cut-off valves;
h. Permit an increase in productivity;
i. Possibility to be used in cut-off valves already installed or to be installed.

This invention refers to a tropicalized petroleum sector cut-off valve gear box system, which includes the following items: a device for pumping lubricant, a distributor pipe, control valves, injector hoses, injector nozzles, a set of injector pipes, a set of drainage pipes, connectors, purging hoses, a reservoir for contaminated lubricant, all the items used on petroleum sector cut-off valve gear boxes.

First, the invention includes a system applicable to any type of petroleum sector cut-off valve gear box, lubricated by oil or grease, new or in operation, in which the components are arranged in the following manner: the pumping device for the lubricant is provided with a distributor tube at the outlet with at least two outlets and each outlet is controlled by control valves that in turn are connected to flexible injector hoses with injector nozzles on the ends. Injection pipes are provided on the gear box, preferably on one of its ends, where the injector nozzles will be connected as well. The gear box is also provided with as many drainage pipes as there are zones of low or no lubrication detected in that model. Through connectors, purging hoses are selectively connected to the drainage pipes, which in turn are connected to the contaminated lubricant reservoir.

Second, the invention includes a method with the following steps:

The available injector hoses are connected, by their respective injector nozzles, to all the injection pipes provided in the gear box model which you wish to decontaminate.

The drainage pipe that is located in a position forward of the plane where the injection pipes are found, is opened;

The purging hose is connected to the first draining pipe, by its respective connection;

With the pumping device running, the control valves are opened;

All the contaminated lubricant is collected in a reservoir, until the decontaminated lubricant begins to come out;

The purging hose is disconnected, closing the first draining pipe;

Another draining pipe is selected, closer to the area where the injection pipes are found, the purging hose is connected;

One or more of the control valves are opened in such a way to direct the flow of lubricant into the area where the draining pipe selected is found;

Collect the contaminated lubricant in the lubricant reservoir;

The preceding three steps are repeated, according to the strategy of the operator for the specific gear box model, until the total decontamination of the entire gear box is finished.

BRIEF DESCRIPTION OF THE DRAWINGS

The invention shall be described in greater detail, together with the related illustrations below (as an example only), which are included with the present report, of which they are an integral part, and in which:

FIG. 2A shows a view in perspective of a second gear box model;

FIG. 2B shows a side view separately of the same gear box; and

DETAILED DESCRIPTION OF THE INVENTION

Figure 1A:
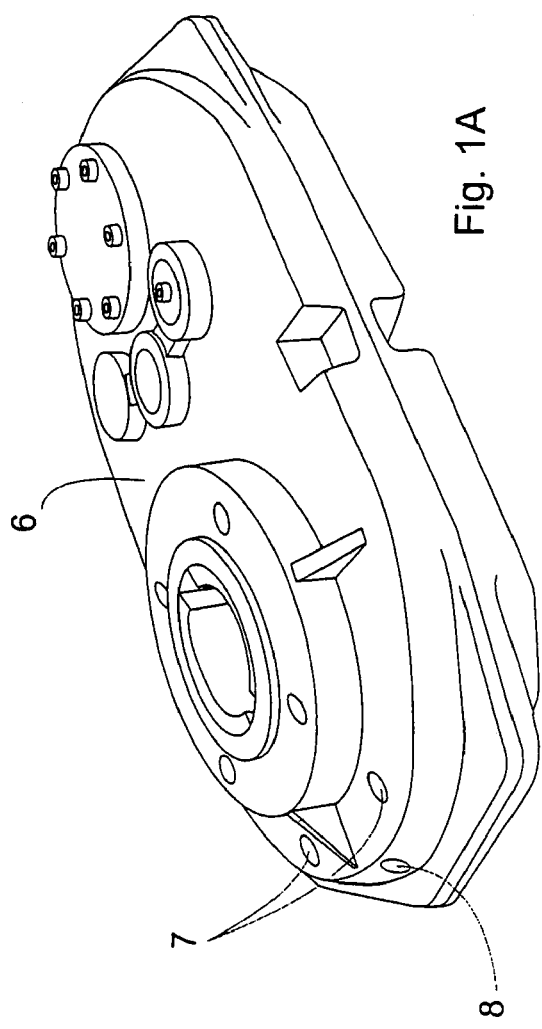
FIG. 1A shows a view in perspective of the gear box model.
Figure 1B:
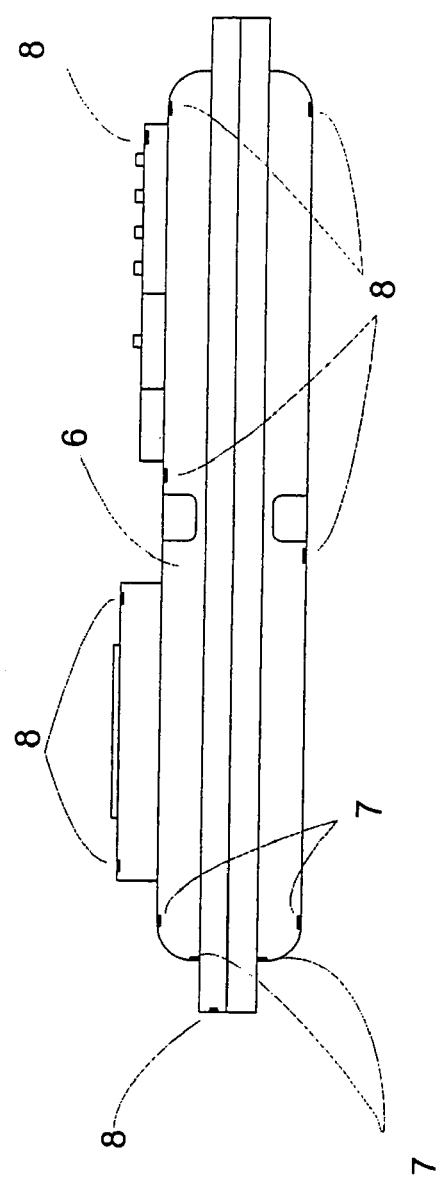
FIG. 1B shows a side view separately of the same gear box.

The tropicalized petroleum sector cut-off valve gear box system was developed from research that sought to optimize the method for decontamination of gear boxes exposed to the severe climatic conditions of the tropics, where the rate of rainfall is extremely high and the variations in temperature, hour to hour, are abrupt.

This radical temperature change due to the typical solar heat of tropical or equatorial regions, with rapid cooling caused by abundant rains, result in a process of condensation due to the high humidity present in the air within the gear boxes.

Gear boxes, usually of cast metal, have their own structures that are shaped around the reducer set. These structures generally strive to save on material instead of rigidity of the case that will hold the reducer set. In this way, the creation of the final format of a gear box is not concerned with the formation of inner sections of the gear box that may experience either more or less lubricant circulation.

Another factor researched in relation to the gear boxes used in cut-off valves is the presence of reinforced internal slots. Since the creation of gear boxes seeks to save on material instead of trying to make a gear box rigid, it is normal to find structural reinforcements in the interior of these gear boxes. These structures, indentations or slots, form areas that retain lubricant or have poor lubrication.

As these gear boxes are generally made to work in temperate climates, where there are no problems of high humidity, the supplying companies are not accustomed to sealing the gear boxes produced for any type of known technology, such as the seal, retainer, or labyrinth, because it would increase the cost quite a bit.

In some specific regions of Brazil, these cut-off valves and their gear boxes undergo a deterioration that is more severe than normally expected. In order to tolerate this action for a longer period of time, they must employ a periodic procedure of totally dismantling the boxes, decontaminating and then remounting them which may require that a specialized technical team work for at least 2 to 3 hours.

FIGS. 1A, 1B, 2A, and 2B only show two types of gear boxes which may be use the system of this invention. Of course, there are other types of gear boxes that may be used.

The newly developed system includes basically a device for pumping lubricant (1), a distributor pipe (2), with some control valves (3), some injector hoses (4), injector nozzles (5), a set of injector pipes (7), and drainage pipes (8) strategically distributed in the gear box, connectors (9), some purging hoses (10), a reservoir for contaminated lubricant (11).

The system was developed in an effort to guarantee the total decontamination of the interior of the gear box, without needing to dismantle it.

Since the maintenance team is responsible for decontamination of several models of gear boxes, and all contain some critical type of internal area in which there is low or no lubrication, a decontamination method was sought for the interior of gear boxes where decontamination of these areas would be guaranteed, without needing to dismantle it and that at the same time could be standardized.

The system consists of a pumping device for lubricant (1) (grease or oil), with a distributor pipe (2) provided at its outlet. The function of the distributor pipe (2) is to branch the lubricant's output into at least two outlets, preferably into four outlets.

The outlets are controlled with control valves (2), which are connected to flexible injector hoses (4) with injector nozzles (5) on the ends.

The second part of the tropicalized petroleum sector cut-off valve gear box system is the most important and sensible to be implemented, and its application is within the gear box (6) itself. It consists of a series of injector pipes (7) and drainage pipes (8) strategically provided for the each gear box model (6).

Due to the layout construction of individual models of gear boxes (6), each contains one or more critical areas where there is low or no lubrication, which truly represents areas in the structure of the box or in the components of the gear reducers that suffer from the action of contaminated lubrication due to the excessive humidity, or acid pollutants coming from severe internal condensation. These areas are pre-checked and determined whether or not they should receive a drainage pipe (8). Each gear box model (6) is provided with as many drainage pipes (8) as there are zones of low or no lubrication in existence in that model.

The gear box (6) is provided with injection pipes (7) preferably on one of its ends. The ideal is that the injection pipes be pierced inside the gear box (6) forming an angle (α) within the range of 30° and 150°, where they are connected to the injector nozzles (5).

At least one drainage pipe (8) is provided in a forward position to the plane formed by the injector pipes (7). The function of this drainage pipe is to decontaminate the whole injection zone before beginning the process of decontamination in the rest of the gear box.

Through connectors (9), purging hoses (10) are selectively connected to the drainage pipes (8), and the purged lubricant is collected in the contaminated lubricant reservoir (11).

The invention also includes an indispensable method to guarantee the decontamination of any gear box that may have the tropicalized petroleum sector cut-off valve gear box system.

The description of the method will be made based on FIG. 3. It should be noted that the inventive concept that is described below has no limitations, and a specialist who possesses technical skills will recognize the existence of the possibility of modifying the sequence, to include or to eliminate certain steps of the method of operation depending on the gear box model to which it will be applied, these alterations are within the scope of the method of the invention.

Figure 3:
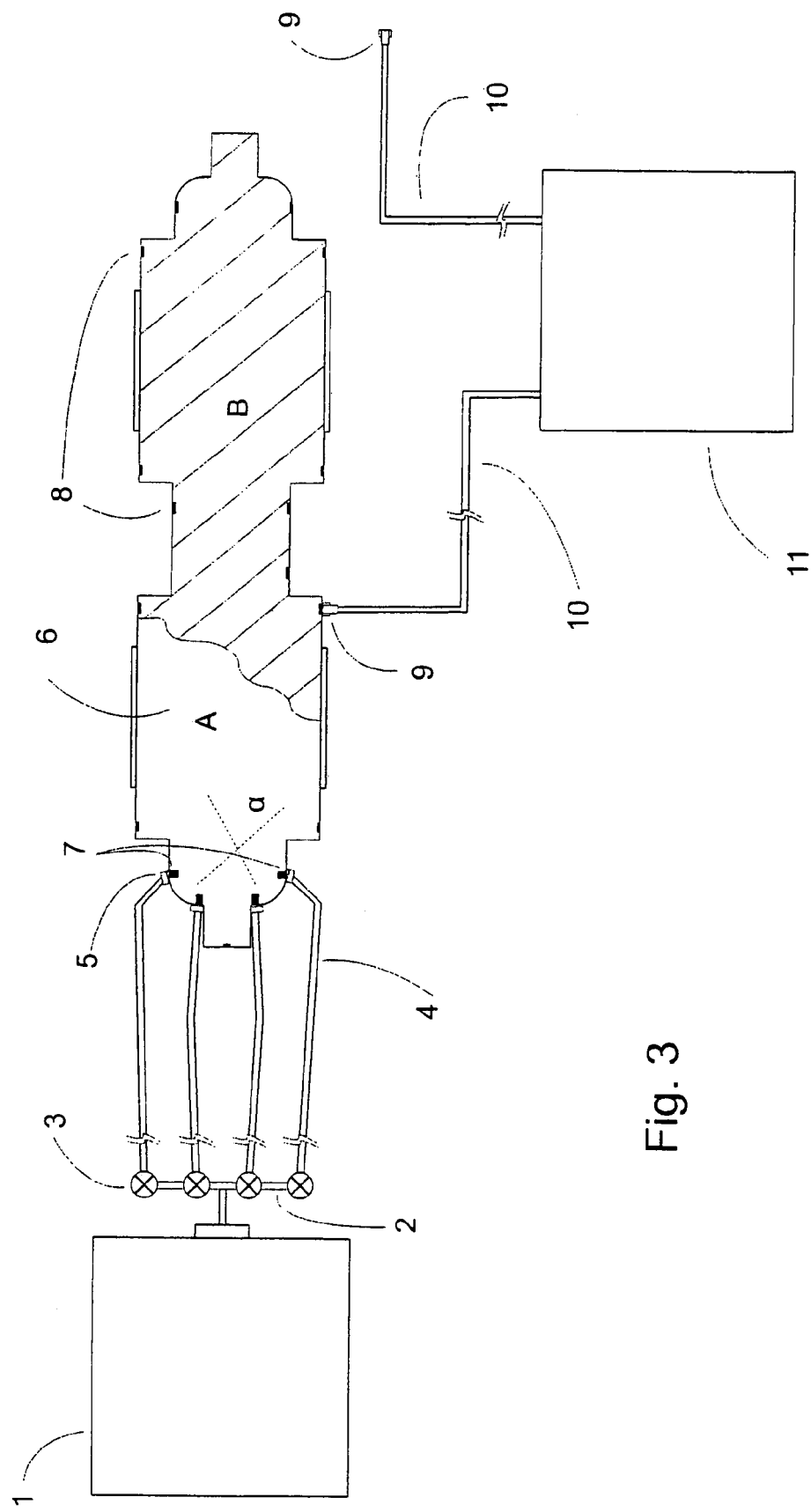
FIG. 3 shows a schematic of the tropicalized petroleum sector cut-off valve gear box system.

In FIG. 3, one can see the beginning of the procedures for carrying out the complete decontamination of the cut-off valve gear box following these steps:

$1^{st}$—Connect the available injector hoses (4), by their respective injector nozzles (5), to all the injection pipes (7) provided in the model of gear box (6) which you wish to decontaminate.

$2^{nd}$—Open the drainage pipe (8) that is located in a position forward of the plane where the injection pipes (7) are found.

$3^{rd}$—Connect the purging hose (10) to the first draining pipe (8), by its respective connection (9).

$4^{th}$—With the pumping device (1) running, open the control valves (3).

$5^{th}$—Collect all the contaminated lubricant in the lubricant reservoir, until the decontaminated lubricant begins to come out.

These first steps of the method guarantee decontamination of the entire area forward to the plane where the injection pipes (7) are located.

$6^{th}$—Disconnect the purging hose (10), close this first draining pipe (8).

$7^{th}$—Select another draining pipe (8), closer to the area where the injection pipes (7) are found, connect the purging hose (10).

$8^{th}$—Open one or more of the control valves (3) are opened in such a way to direct the flow of lubricant into the area where the draining pipe (8) selected is found.

As shown in FIG. 3, it is easy to see that a decontamination zone (A) and a still contaminated zone (B) begin to form. But as the application of this method continues, it is possible to control the flow of the new lubricant to any area inside the gear box (6) however the operator wishes. All that needs to be done is to select a drainage pipe (8), to be opened, and the volume, and direction of the lubricant to be injected inside the gear box (6), by simultaneously opening and closing the control valves (3).

This condition of channeling and controlling the flow and volume of the injected lubricant guarantees total decontamination of the inside of the gear box, since the drainage pipes (8) only need to be correctly provided on all models of the gear boxes, as determined by detection of the areas of low or no lubrication and the high risk for failure of the respective model.

9th—Collect the contaminated lubricant in the lubricant reservoir (11).

10th—Repeat steps 7, 8, and 9, according to the strategy of the operator for the specific model of gear box (6), until the total decontamination of the entire gear box is finished.

This method is performed in just a few minutes, and allows for a simultaneous inspection, that lasts around 12 days to check all 340 cut-off valves, the total decontamination and maintenance of their respective gear boxes. All of this is performed at low cost, with no need for procedures of dismantling and reassembly, and significantly reduces the number of technicians necessary to carry out the maintenance cycle on all the cut-off valves of the upgraded industrial plant.

Another unquestionable advantage of the application of the tropicalized petroleum sector cut-off valve gear box system is the ability to perform the decontamination method without needing to interrupt production in the sector where a cut-off valve is located.

The invention has been described herein with reference made to its preferred final applications. However, it must be clarified that the invention is not limited to only these applications, and those with technical abilities will immediately realize that alterations and substitutions may be made within the concept of this invention here described.

The invention claimed is:

1. Tropicalized petroleum sector cut-off valve gear box system, comprising:
    a petroleum sector cut-off valve gear box, lubricated by oil or grease, new or in operation;
    a set of injector pipes provided at or adjacent a forward end of the gear box;
    a set of drainage pipes, there being at least as many drainage pipes as there are zones of low or no lubrication detected in the gear box;
    a pumping device for lubricant provided with a distributor tube at an output port thereof for branching the lubricant into at least two outlets, the at least two outlets being controlled by control valves that are in turn connected to flexible injector hoses with injector nozzles on distal ends thereof; said injector nozzles being adapted to be connected respectively to said injection pipes; and
    at least one purging hose selectively connected through a connector to each of the drainage pipes, said at least one purging hose being in turn connected to a contaminated lubricant reservoir,
    wherein at least two said injector pipes are disposed vertically above a horizontal midline of said gear box and at least two said injector pipes are provided vertically below said horizontal midline of said gear box, at least one of said drainage pipes is provided at a position forward of said injector pipes, at least one of said drainage pipes is provided rearwardly of the injector pipes, at least one of said rearward drainage pipes being provided in a position vertically above said injector pipes and at least one of said rearward drainage pipes being provided at an elevation corresponding to or below a vertically lowermost one of said injector pipes.

2. Tropicalized petroleum sector cut-off valve gear box system in accordance with claim 1, wherein the injector pipes are pierced inside the gear box.

3. Method of decontamination for petroleum sector cut-off valve gear boxes, comprising:
    provide a petroleum sector cut-off valve gear box, lubricated by oil or grease, new or in operation,
    provide a set of injection pipes at or adjacent a forward end of the gear box;
    provide a set of drainage pipes, there being as many drainage pipes as there are zones of low or no lubrication detected in the gear box, at least a first one of said drainage pipes being located in a position forward of the injection pipes;
    provide a pumping device for lubricant having a distributor tube at an output port thereof for branching the lubricant into at least two outlets, the at least two outlets being controlled by control valves that are in turn connected to flexible injector hoses with injector nozzles on distal ends thereof, said injector nozzles being adapted to be connected respectively to said injection pipes;
    provide at least one purging hose selectively connected through a connector to each of the drainage pipes, said at least one purging hose being in turn connected to a contaminated lubricant reservoir; the decontamination method comprising:
    a) connect the available injector hoses, by their respective injector nozzles, to all the injection pipes provided in the gear box to be decontaminated;
    b) open the first drainage pipe that is located in a position forward of the injection pipes;
    c) connect the purging hose to the first draining pipe, by its respective connection;
    d) with the pumping device running, open the control valves;
    e) collect all the contaminated lubricant in the lubricant reservoir, until the decontaminated lubricant begins to come out;
    f) disconnect the purging hose, close this first draining pipe;
    g) select another draining pipe, close to the area where the injection pipes are found, connect the purging hose;
    h) open one or more of the control valves in such a way to direct the flow of lubricant into the area where the selected draining pipe is located;
    i) collect the contaminated lubricant in the lubricant reservoir; and
    j) repeat steps g), h), and i), according to the specific model of gear box, until the total-decontamination of the entire gear box is finished,
    wherein at least two said injector pipes are disposed vertically above a horizontal midline of said gear box and at least two said injector pipes are provided vertically below said horizontal midline of said gear box, at least one of said drainage pipes is provided at a position forward of said injector pipes, at least one of said drainage pipes is provided rearwardly of the injector pipes, at least one of said rearward drainage pipes being provided in a position vertically above said injector pipes and at least one of said rearward drainage pipes being provided at an elevation corresponding to or below a vertically lowermost one of said injector pipes.

4. Tropicalized petroleum sector cut-off valve gear box system in accordance with claim 1, the gear box is provided with 4 injector pipes.

* * * * *